March 15, 1927.  T. MONTERUBIO  1,620,776
TROPICAL HOUSE
Filed June 24, 1926   3 Sheets-Sheet 1
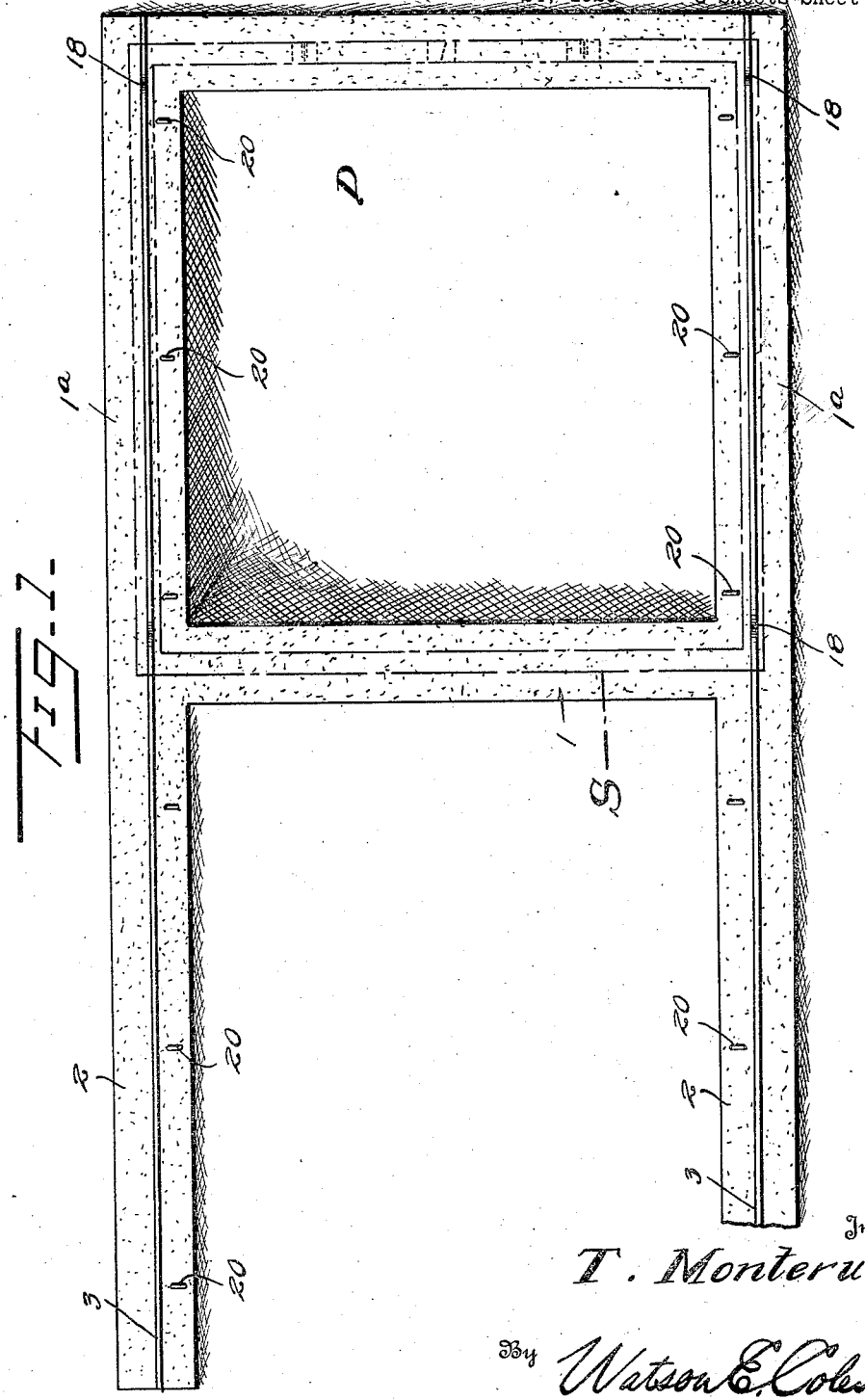
Inventor
T. Monterubio.
By Watson E. Coleman
Attorney

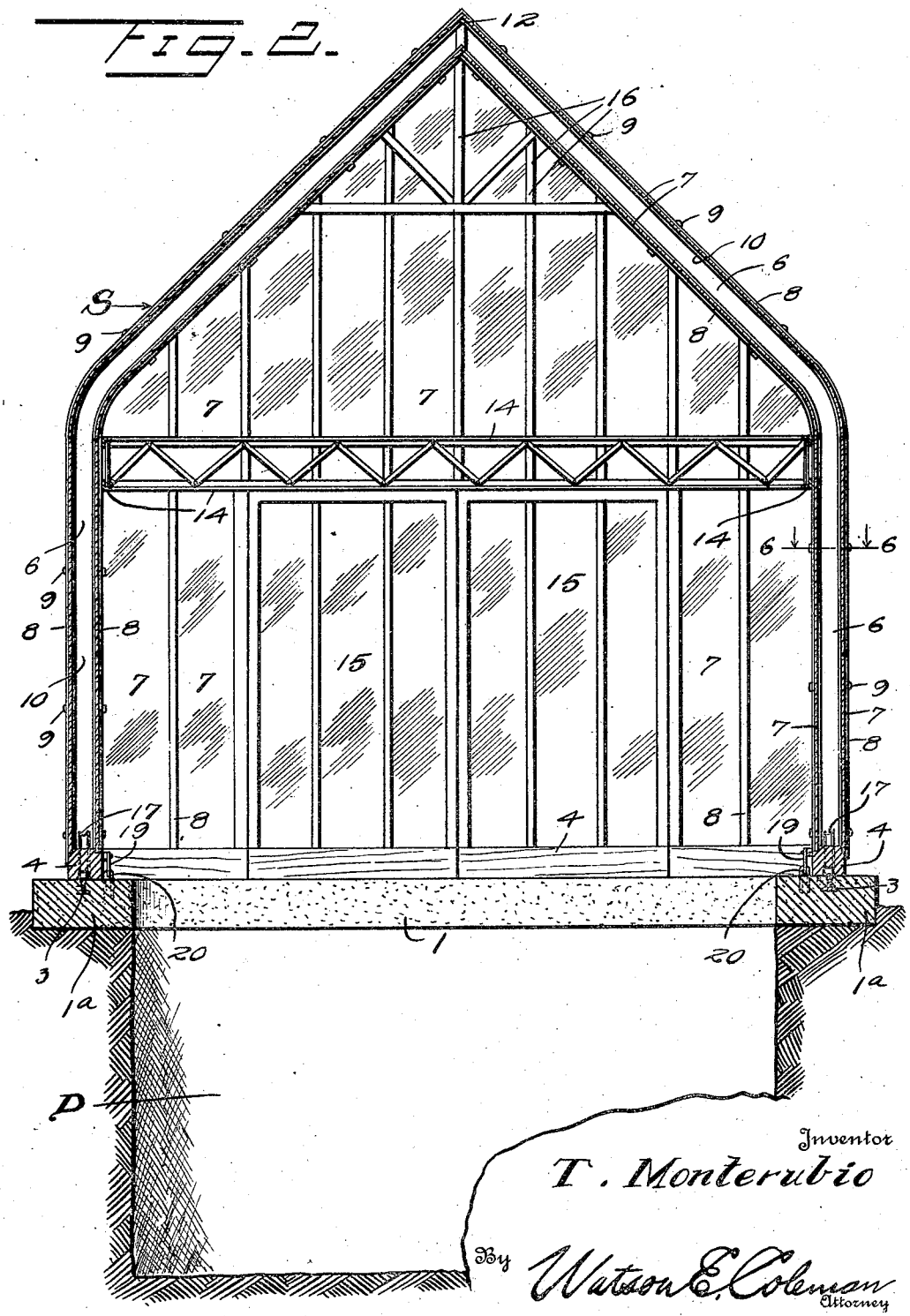

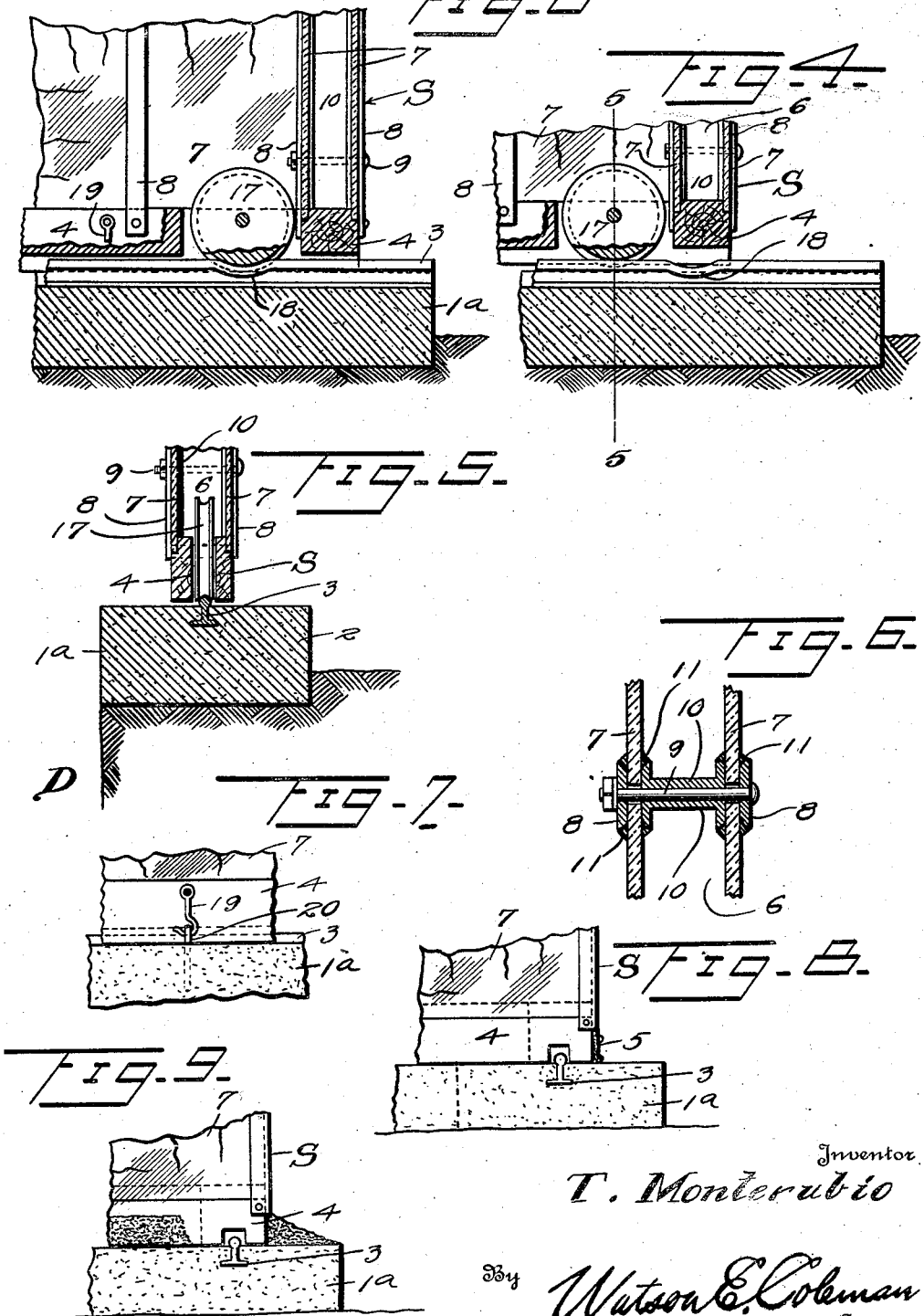

Patented Mar. 15, 1927.

1,620,776

UNITED STATES PATENT OFFICE.

TAIDE MONTERUBIO, OF ST. LOUIS, MISSOURI.

TROPICAL HOUSE.

Application filed June 24, 1926. Serial No. 118,337.

This invention relates to a tropical house and it is an object of the invention to provide a structure of this kind whereby it is possible to grow and raise tropical trees in either of the temperate zones up to approximately latitude forty.

It is also an object of the invention to provide a structure of this kind which is particularly adapted for the growing in either of the temperate zones tropical trees, such as mango, papaw, guava, guanabana, banana, zapote, alligator pear, coffee, rubber, etc., and which growth is effected without the use of artificial heat and with the direct sun rays only.

An additional object of the invention is to provide a structure of this kind wherein the foliage is subjected to the desired moisture essential to its growth.

The invention consists in the details of construction and in the combination and arrangement of the several parts of my improved tropical house whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan of the base structure comprised in the tropical house as herein disclosed, the shiftable structure being diagrammatically indicated by broken lines;

Figure 2 is a vertical sectional view taken through the structure as herein disclosed;

Figure 3 is an enlarged fragmentary sectional view illustrating the means herein disclosed for positioning the shiftable structure directly above the associated pit or ditch;

Figure 4 is a fragmentary sectional view showing the shiftable structure in a second position;

Figure 5 is a sectional view taken substantially on the line 5—5 of Figure 4;

Figure 6 is a fragmentary detailed view partly in section and partly in elevation illustrating the manner of assembling the glass panels of the double walls of the shiftable structure as herein set forth;

Figure 7 is a fragmentary elevational view illustrating the means herein employed for holding the shiftable structure in either of its two positions;

Figure 8 is a fragmentary sectional view illustrating the means to prevent air passing into the house when the shiftable structure is in proper position above the pit or ditch;

Figure 9 is a sectional view illustrating a further means for sealing the shiftable structure when in position above the pit or ditch.

As disclosed in the accompanying drawings, D denotes an artificially dug ditch or pit of requisite dimensions but preferably of an average depth of ten feet although it is to be understood that the depth of this ditch or pit may be varied in accordance with the species of trees to be grown.

The side and bottom walls of the ditch or pit D are in no way obstructed so that the moisture absorbed by the soil may readily diffuse within the ditch or pit in order to maintain the temperature around the trees growing therein at such degree of moisture essential to the growth of the foliage and which is of especial importance when growing in either of the temperate zones tropical trees such as mango, papaw, guava, guanabana, banana, zapote, alligator pear, coffee, rubber, etc.

The upper portions of the side walls of the ditch or pit D are defined by a coping or base 1 preferably concrete, and opposed lengths 1ª of such coping are continued by the extensions 2. The extensions 2 and the associated lengths 1ª of the coping or base have extending therealong from substantially one end to the other the rails 3. These rails 3 are embedded within the cementitious material with the exception of a slight portion of the ball of each of the rails which projects a slight distance above the upper surfaces of the lengths 1ª and the extensions 2.

The rails 3 provide a trackway for a shiftable structure S. This structure S comprises the base sills 4 which, when the structure S is directly above the ditch or pit D, have direct contact with the coping 1 so that the liability of air passing inwardly of the structure S between the sills 4 and the coping 1 is substantially avoided. To further prevent such entry of outside air, the sills 4 may have secured thereto weatherstripping 5, as illustrated in Figure 8 of the drawings, for contact with the coping or, as illustrated in Figure 9, sand or the like may be placed upon the coping against opposite sides of the sills. While I particularly refer to these two means of sealing the contact between the sills 4 and the coping 1, I wish it to be understood that other means may be employed as may be preferred or the necessities of practice require.

The side walls and roof of the structure S are such to provide therebetween a dead air space 6 to provide an effective heat insulation, that is to say, to prevent the lower exterior temperature effecting the temperature within the structure S when in working position and also to effectively retain the higher temperature within the portable structure and ditch or pit so that trees confined therein will be subjected to substantially the same condition during the winter months as in their native climate.

The walls and roof comprise the spaced glass panels 7 effectively maintained in desired assembled relation by the holding plates 8. Each set of plates 8 has associated therewith a clamping bolt 9 and arranged closely adjacent to and at both sides of the bolt 9 are the U-strips 10 whereby the outer and inner panels are effectively maintained in their desired separated relation in accordance with the dimensions of the dead air space 6 desired. The marginal portions of the plates 8 and the adjacent portions of the panels 7 preferably have applied thereto a sealing medium 11, such as putty, in order to assure the desired hermetic sealing of the panels to prevent the entrance or exit of air with respect to the interior of the structure S and more especially when in working or applied position with respect to the ditch or pit D.

The roof of the shiftable structure S is of a gable type with its ridge 12 disposed in the direction of travel or shifting of the structure S. The upper portions of the side walls of the structure S at a point immediately adjacent to their junction with the roof have disposed therearound reinforcing or strengthening trusses 14 so that the upper portions of such walls will be effectively braced or strengthened to withstand strain imposed thereupon by high winds. The truss structures 14 are arranged inwardly of the portable structure S and offer no hindrance or obstruction to the foliage of the trees housed by such structure and also permit unhindered shifting of the structure when it is moved to a position away from the ditch or pit D.

The wall of the structure S remote from the extensions 2 is provided with relatively large doors 15 which extend from the bottom of the structure to a point adajacent to a truss structure 14 as will hereinafter be more particularly referred to.

The ridge portion of the roof of the portable structure is braced or reinforced at desired points therealong in a conventional manner by the beams 16.

The end portions of the sills 4 coacting with the lengths 1ª of the coping and the extensions 2 are provided with the grooved wheels 17 which ride upon the rails 3. These wheels, as herein disclosed, are disposed through such sills 4 in order to effect the requisite relation between these sills 4 and the coping. When the structure S is properly positioned above the ditch or pit D each of the wheels 17 will drop within a depression 18 provided in the associated rail 3, such depression 18 being of such depth to assure the sills 4 of the structure S coming into direct contact with the coping 1. Upon proper stress or strain being imposed upon the structure S, the wheels 17 will readily pass out of the depressions 18 resulting in a slight yet sufficient raising of the structure S to assure the same being shifted or moved along the trackway 3 to a location at one side of the pit or ditch D.

In practice, the structure S is positioned above the ditch or pit D during the winter months. It is to be understood, however, that if the tropical house is being used in connection with the growing of trees such as mango, banana, papaw, coffee and rubber, the structure S should be maintained in working position with respect to the ditch or pit D until the normal temperature does not fall below sixty degrees Fahrenheit.

During those periods when the trees within the ditch or pit D are further confined or housed by the structure S, it is not required to use artificial heat but only the direct rays of the sun which will readily pass through the side walls and roof of the portable structure and have requisite effect upon the trees and create and maintain the desired relative high temperature within the portable structure and ditch or pit and which temperature, together with the moisture within such confined area, assures the desired development of the trees.

During the summer months or when the temperature is satisfactory, the structure S is moved along the rails 3 to one side of the ditch or pit D, and thus permitting the trees to further develop under natural climatic conditions.

While the depressions 18 assure the proper positioning of the structure S over the ditch D and to a considerable extent to maintain the structure in such position, I find it of advantage to provide further means to effect a positive anchoring of the structure S and, as herein disclosed, this is done through the medium of the hook members 19 carried by the sills 4 and engaging the upstanding staples 20 carried by the coping 1. This same means is employed to hold the structure S against displacement when in its inoperative position or when arranged to one side of the ditch D. This positive anchoring means is of particular importance to prevent displacement of the structure S as a result of high winds.

While I have hereinbefore particularly referred to my improved house for use in connection with the development of tropical trees and the like in either of the temperate zones, it is to be understood that it can also be employed to the same advantage in latitudes above forty for the growth and development of semi-tropical trees or trees native to lower latitudes.

The structure S in practice is of a height whereby the upper edge of a door opening in a wall thereof will closely approximate the maximum growth of the trees being developed although in the event the trees should reach a greater height, the tops will readily flex to permit the structure S to be moved or shifted to its inoperative position.

It will be understood that the dimensions of the ditch or pit D and the portable structure S are dependent upon the number of trees desired to be grown. On a large scale, the ditch or pit may be of a material length and a plurality of structures S employed or otherwise as appears to be the most practical.

From the foregoing description it is thought to be obvious that a tropical house constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A tropical house comprising, in combination, spaced rails providing a trackway, an artificially dug ditch being provided between portions of the rails, the walls of the ditch being unobstructed, a portable structure traveling on the rails for movement above the ditch or to a point to one side thereof, and means for locking the structure when in either of said two positions against displacement with respect to the rails, the walls of the structure having their major portions transparent.

2. A tropical house comprising, in combination, spaced rails providing a trackway, an artificially dug ditch being provided between portions of the rails, the walls of the ditch being unobstructed, a portable structure traveling on the rails for movement above the ditch or to a point to one side thereof, means for locking the structure when in either of said two positions against displacement with respect to the rails, the walls of the structure having their major portions transparent, and wheels carried by the portable structure directly engaging the rails, said rails being provided with depressions to receive the wheels when the portable structure is properly positioned over the ditch and to cause the structure to have a slight drop.

3. A tropical house comprising, in combination, a continuous coping, the area defined by the coping constituting an artificially dug ditch, the walls of the ditch being unobstructed, rails mounted upon the coping at opposite sides of the ditch and extending beyond the ditch, a portable hothouse structure, wheels carried by said structure riding on the rails, said rails adjacent to the ditch having depressed portions to receive the wheels of the structure to bring said structure in direct contact with the coping when the structure is positioned entirely over the ditch.

4. A tropical house comprising, in combination, a continuous coping, the area defined by the coping constituting an artificially dug ditch, the walls of the ditch being unobstructed, rails mounted upon the coping at opposite sides of the ditch and extending beyond the ditch, a portable hothouse structure, wheels carried by said structure riding on the rails, said rails adjacent to the ditch having depressed portions to receive the wheels of the structure to bring said structure in direct contact with the coping when the structure is positioned over the ditch, and means for locking the portable structure when in such position to the coping.

5. A tropical house comprising, in combination, a continuous coping, the area defined by the coping constituting an artificially dug ditch, the walls of the ditch being unobstructed, rails mounted upon the coping at opposite sides of the ditch and extending beyond the ditch, a portable hothouse structure, wheels carried by said structure riding on the rails, said rails adjacent to the ditch having depressed portions to receive the wheels of the structure to bring said structure in direct contact with the coping when the structure is positioned over the ditch, and means to prevent passage of air between the structure and coping when in direct contact with the coping.

In testimony whereof I hereunto affix my signature.

TAIDE MONTERUBIO.